ically deformable elongated piece having means along a portion thereof towards one end for supporting a portion of a wiper blade, and a yoke pivotally mounted towards the other end of said elongated piece for supporting the portion of the blade rubber not carried by the said elongated piece. By mounting the blade in this manner the blade can undergo independant deformation on each side of the articulation point of the wiper arm, which eliminates practically all risk of lift-away such as can occur with known wipers when they encounter zones of great curvature.

United States Patent [19]

Hancou

[11] 4,337,547
[45] Jul. 6, 1982

[54] SCREEN WIPER

[75] Inventor: Theodore Hancou, Chene-Bougeries, Switzerland

[73] Assignee: Societe d'Exploitation de Brevets J.B., Fribourg, Switzerland

[21] Appl. No.: 125,059

[22] Filed: Feb. 27, 1980

[30] Foreign Application Priority Data

Dec. 1, 1979 [CH]  Switzerland ......................... 2018/79

[51] Int. Cl.$^3$ ............................. B60S 1/04; B60S 1/40
[52] U.S. Cl. ............................. 15/250.42; 15/250.32
[58] Field of Search ......................... 15/250.32, 250.42

[56]  References Cited
U.S. PATENT DOCUMENTS

| 2,664,583 | 1/1954 | Oishei | 15/250.42 |
| 3,177,514 | 4/1965 | Wise | 15/250.42 |
| 3,871,050 | 3/1975 | Baut et al. | 15/250.32 |
| 3,935,612 | 2/1976 | Wittwer | 15/250.42 |

FOREIGN PATENT DOCUMENTS

| 1048495 | 1/1959 | Fed. Rep. of Germany | 15/250.32 |
| 1918917 | 10/1970 | Fed. Rep. of Germany | 15/250.42 |
| 1169384 | 9/1958 | France | 15/250.32 |

Primary Examiner—Peter Feldman
Attorney, Agent, or Firm—James C. Wray

[57]  ABSTRACT

A screen wiper intended to be detachably fitted on the end of a wiper arm, comprises a harness having means for attachment of the harness to said arm, an elastically deformable elongated piece having means along a portion thereof towards one end for supporting a portion of a wiper blade, and a yoke pivotally mounted towards the other end of said elongated piece for supporting the portion of the blade rubber not carried by the said elongated piece. By mounting the blade in this manner the blade can undergo independant deformation on each side of the articulation point of the wiper arm, which eliminates practically all risk of lift-away such as can occur with known wipers when they encounter zones of great curvature.

8 Claims, 8 Drawing Figures

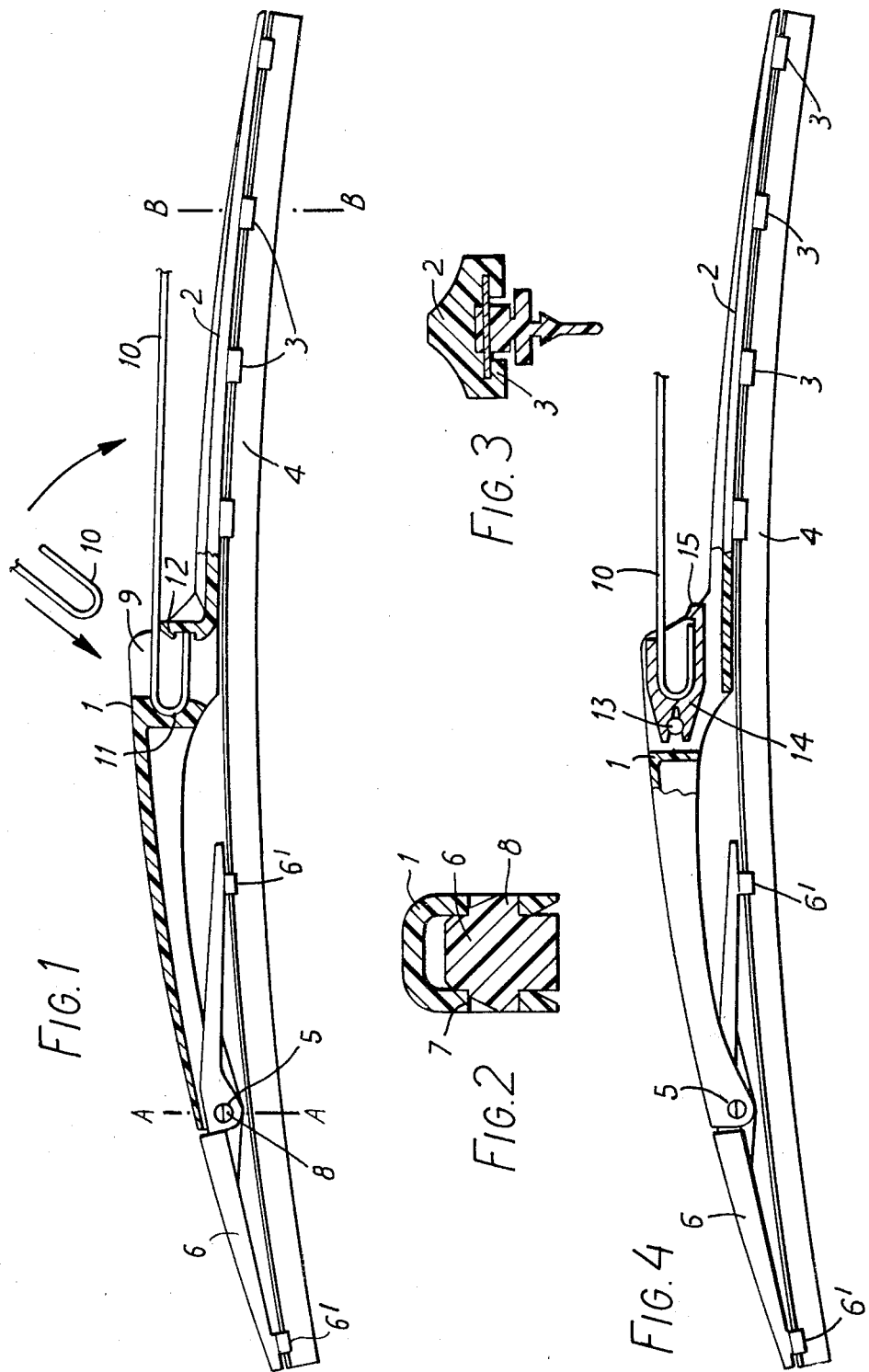

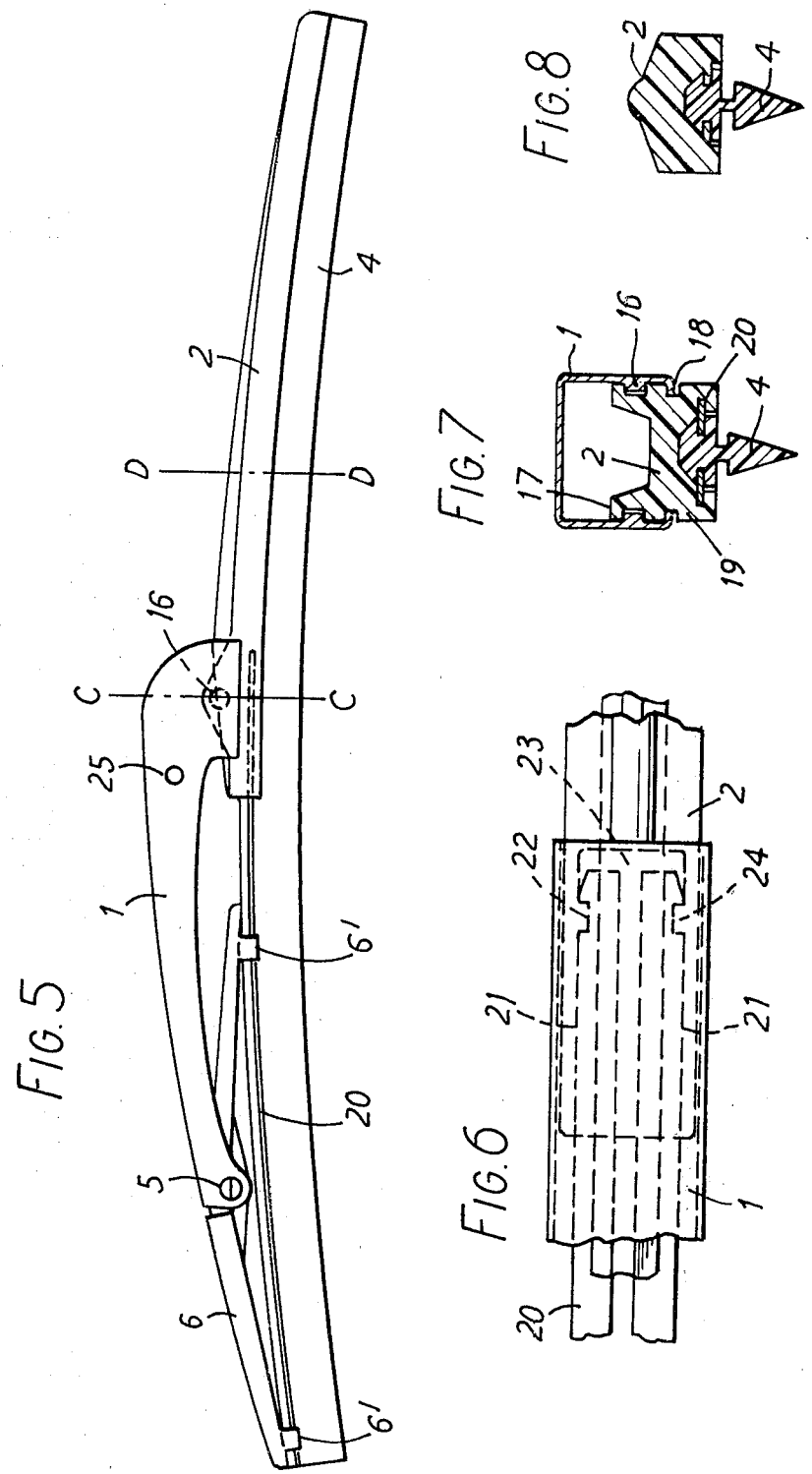

SCREEN WIPER

BACKGROUND OF THE INVENTION

The present invention relates to screen wipers for automobile vehicles, such as those utilised for wiping windscreens, rear windows or headlamps of vehicles.

STATEMENT OF PRIOR ART

These wipers, which are detachably mounted on the ends of oscillating arms, are generally intended to wipe surfaces having a certain curvature, and thus they must be capable of deformation in a plane at right angles to the surface to be wiped. In order to permit of obtaining such deformation the known wipers are generally constituted by a harness which can be detachably fitted on a screen wiper arm, this harness receiving pivoting yokes the ends of which comprise claws intended for the fitting of a wiper blade rubber.

Thus these known screen wipers can possess a great deformability which can be troublesome when the curvature of the surface to be wiped varies greatly, as the application pressure is applied solely at the point of articulation of the wiper on the arm, and is in danger of causing lifting away.

OBJECT OF THE INVENTION

In a screen wiper of the above-stated type, the invention aims at obtaining practically independent deformabilities on each side of the articulation point on the arm, which eliminates practically all risk of lift-away such as can occur with known wipers when they encounter zones of great curvature.

SUMMARY OF THE INVENTION

According to the invention there is provided a windshield wiper assembly intended to be detachably fitted on the end of a wiper arm, comprising an elastically deformable elongated harness, pivot means disposed between the ends of said harness by which the arm may be pivotally attached to the harness, a support surface on said harness on the side to face the windshield and extending from the region of said pivot to one end of said harness, said support surface being concave with a predetermined radius prior to application of the assembly to the windshield, which support surface becomes less concave during application due to the elastic nature of said harness, claw means disposed at intervals along the length of said support surface, a yoke pivotally attached at its center to the other end of said harness, further claw means provided at each end of said yoke, and a wiper blade unit gripped by the claw means on both the harness and yoke, having a portion lying in contact with said support surface over the length thereof and deformed to the same curvature as that of said support surface, the remaining portion of the wiper blade unit being supported by said yoke.

BRIEF DESCRIPTION OF THE DRAWINGS

Such a screen wiper is represented by way of nonlimitative example in the accompanying drawings, wherein:

FIG. 1 is a lateral elevation, partially in longitudinal section, of a wiper according to a first form of embodiment of the invention;

FIG. 2 is a sectional view along A—A in FIG. 1;

FIG. 3 is a sectional view along B—B in FIG. 1;

FIG. 4 is a lateral elevation, partially in longitudinal section, of a wiper according to a second form of embodiment of the invention;

FIG. 5 is a lateral elevation of a wiper according to a third form of embodiment of the invention;

FIG. 6 is a plan view of a part of the wiper according to FIG. 5, the harness being assumed to be transparent;

FIG. 7 is a sectional view along C—C in FIG. 5; and

FIG. 8 is a sectional view along D—D in FIG. 5.

DESCRIPTION OF PREFERRED EMBODIMENT

In the example of embodiment according to FIGS. 1 to 3 the wiper comprises a harness 1 prolonged to one side by an elongated piece 2 equipped with claws 3 so as to grasp substantially one half of a wiper blade rubber 4. Opposite to the piece 2 the harness 1 comprises a spindle 5 for the articulation of a yoke 6. In the example as described the yoke 6, through its end claws 6', directly carries the second part of the blade rubber 4. Of course if the length of the blade rubber makes it necessary, the yoke 6 can carry a pivoting secondary yoke at one end at least, the extremities of which support the blade rubber.

The elongated piece 2, which is integral with the harness 1 in the example according to FIGS. 1 to 3, is of elastically deformable material, for example polycarbonate, and possesses a certain curvature in the state of rest, which ensures a pre-stress when the blade rubber is pressed upon the surface to be wiped. It is essentially this pre-stress which ensures that the part of the blade rubber 4 grasped between the claws 3 matches the curvature of the surface to be wiped.

The harness 1, in the zone of the articulation spindle 5, has a U-shaped section in which the yoke 6 is lodged which comprises two spindle stubs 8 which snap into two holes 7 formed in the sides of the U of the harness 1, permitting very simple and rapid assembly.

The harness 1 comprises a recess 9 intended to receive the hook-shaped end 10 of a wiper arm. To this end one wall of the recess 9 comprises a cylindrical surface 11 against which the rounded part of the hook 10 can pivot. The opposite wall of the recess 9 comprises an elastic abutment 12 which retains the curved-back end of the hook 10, after having been deformed to permit it to penetrate, a certain play being provided to permit a limited rotation of the harness 1 in relation to the hook 10.

The bearing pressure of the hook-arm 10 is transmitted to the articulation point 5 through the intermediary of the harness 1, so that the yoke 6 can incline according to the curvature of the surface wiped by the second part of the blade rubber 4, practically without influencing the form of the elongated piece 2.

The form of embodiment according to FIG. 4 is substantially identical with the previous form, except for the sole difference consisting in that the recess 9 comprises a transverse spindle 13 over which there is pivotally snapped a cover piece 14 in which the hook 10 comes to lodge, the extremity of which is made fast by an elastic dog 15.

In the variant according to FIGS. 5 to 8 the harness 1 and the elongated piece 2 are separate from one another, the harness 1 can be of metal and the piece 2 of elastic plastic material. The harness 1 comprises a U-shaped section provided with two transverse lugs 16 which penetrate into corresponding recesses 17 of the piece 2, to permit pivoting of the harness 1 in relation to the piece 2. This pivoting is limited by the penetration, with play, of turned-over tabs 18 of the harness in grooves 19 of the piece 2, the assembly being effected by snap engagement with elastic deformation of the piece 2.

In the zone external to the piece 2 the blade rubber 4 comprises a stiffening bead 20 (FIG. 6) terminated by two tabs 21 provided with notches 22 which snap elastically into a recess 23 of the piece 2, which recess is provided with lugs 24 which penetrate into the notches 22. In the zone of the piece 2 the blade rubber 4 is lodged directly in the piece 2 (FIGS. 7 and 8). The harness 1 comprises a transverse hole 25 for its fixing to the wiper arm.

I claim:

1. A windshield wiper assembly intended to be detachably fitted on the end of a wiper arm, comprising:
   (a) an elastically deformable elongated harness,
   (b) pivot means disposed between the ends of said harness by which the arm may be pivotally attached to the harness,
   (c) a support surface on said harness on the side to face the windshield and extending from the region of said pivot to one end of said harness, said support surface being concave with a predetermined radius prior to application of the assembly to the windshield, which support surface becomes less concave during application due to the elastic nature of said harness,
   (d) claw means disposed at intervals along the length of said support surface,
   (e) a yoke pivotally attached at its center to the other end of said harness,
   (f) further claw means provided at each end of said yoke, and
   (g) a wiper blade unit gripped by the claw means on both the harness and yoke, having a portion lying in contact with said support surface over the length thereof and deformed to the same curvature as that of said support surface, the remaining portion of the wiper blade unit being supported by said yoke.

2. An assembly according to claim 1, wherein the harness comprises a single piece of plastics material.

3. An assembly according to claim 1, wherein a portion of the harness having the support surface is articulated upon the remaining portion of said harness which carries the yoke.

4. An assembly according to claim 1, wherein the remaining wiper blade unit portion not supported by the harness piece comprises a stiffening bead having notched tabs which snap fit into a recess in said harness.

5. A wiper according to claim 1, wherein the means for attachment of the harness comprises a recess to receive one end of the wiper arm.

6. A wiper according to claim 5, wherein one wall of the said recess is provided with a cylindrical surface and the opposite wall comprises an elastically deformable abutment and the end of the arm is in the form of a hook.

7. A wiper according to claim 5, wherein the said recess pivotally receives a cover piece which receives the end of the arm.

8. A wiper according to claim 1, wherein said yoke is mounted pivotally by snap engagement on the said harness.

* * * * *